United States Patent [19]

Stefanov et al.

[11] Patent Number: 4,637,725
[45] Date of Patent: Jan. 20, 1987

[54] SELF-REFERENCING MACH-ZEHNDER INTERFEROMETER

[75] Inventors: Michael E. Stefanov, San Jose; Brian J. Sullivan, Menlo Park, both of Calif.; Anthony J. Ticknor, Tucson, Ariz.

[73] Assignee: Lockheed Missiles & Space Company, Inc., Sunnyvale, Calif.

[21] Appl. No.: 780,520

[22] Filed: Sep. 26, 1985

[51] Int. Cl.$^4$ ............... G01B 9/02; G01B 11/02
[52] U.S. Cl. ............................. 356/354; 356/355
[58] Field of Search ............ 356/345, 346, 352, 353, 356/354, 355, 359, 360, 363; 350/358

[56] References Cited

U.S. PATENT DOCUMENTS

| 3,494,698 | 2/1970 | Neumann | 356/345 |
| 4,030,830 | 6/1977 | Holly | 356/359 |
| 4,594,002 | 6/1986 | McNally | 356/352 X |

FOREIGN PATENT DOCUMENTS

| 0731278 | 4/1980 | U.S.S.R. | 356/355 |
| 0735914 | 9/1980 | U.S.S.R. | 356/355 |

Primary Examiner—Eugene R. LaRoche
Assistant Examiner—Steven J. Mottola
Attorney, Agent, or Firm—John J. Morrissey

[57] ABSTRACT

An interferometer in Mach-Zehnder configuration comprises beamsplitters (10, 12) and mirrors (11, 13), which divide an optical beam whose wavefront is to be monitored into an information component and a reference component, and which recombine the information and reference components to form an interference pattern that changes dynamically at a spatial light modulator (14) in response to dynamic variations in the atmosphere through which the beam passes. A spatial light filter (15) comprising a plate with a pin-hole aperture is positioned to transmit the reference component of the beam, but with second-order aberrations being removed from the reference component prior to recombination of the information and reference components. The wavefront of the reference component that recombines with the information component is a substantially unaberrated version of the wavefront of the beam whose wavefront is to be monitored. An acousto-optical beam-steering device (20) steers the reference component in real time so as to maintain substantially continuous alignment of a maximum-intensity centroid of the reference component with respect to the pin-hole aperture of the spatial light filter (15).

1 Claim, 3 Drawing Figures

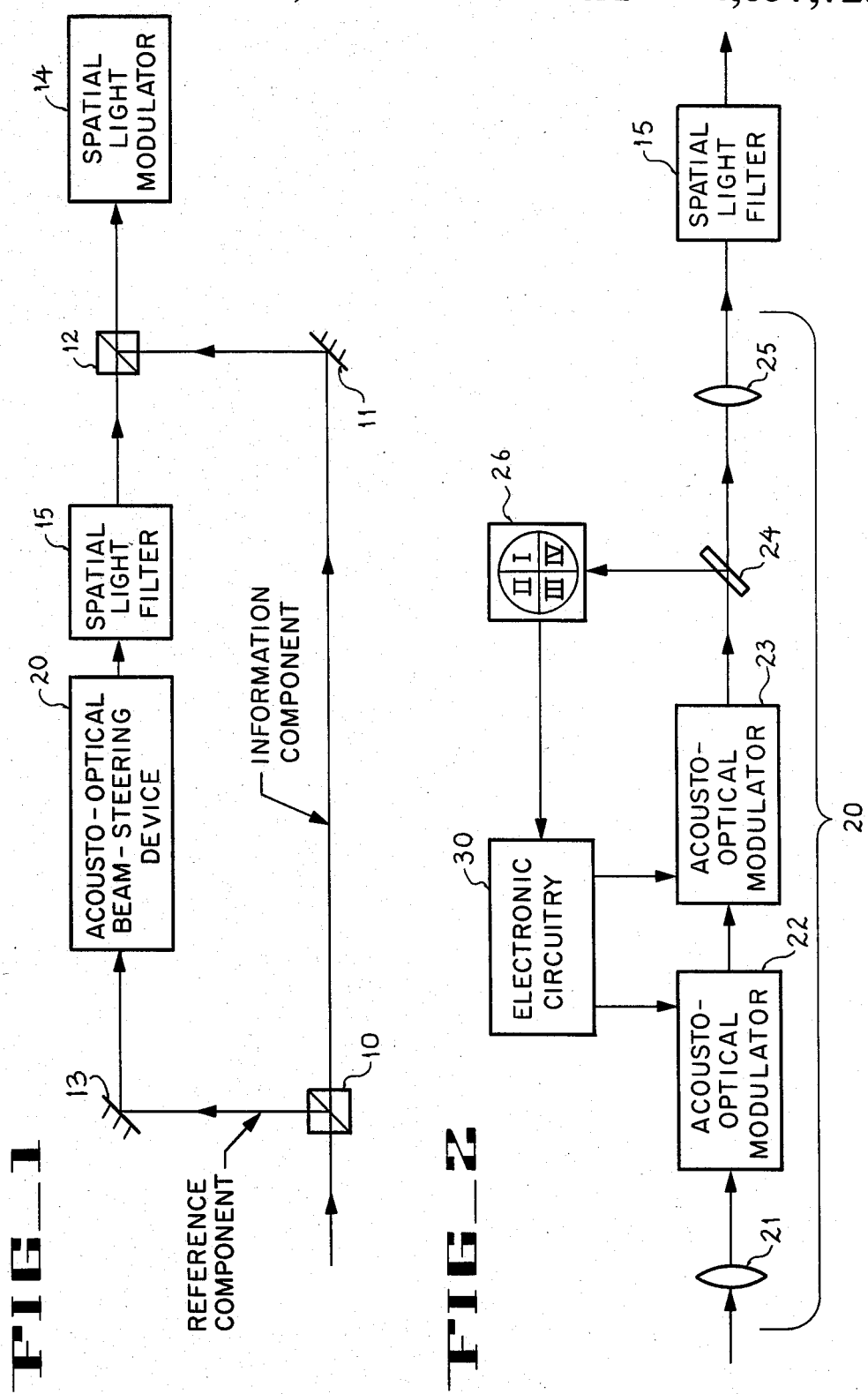

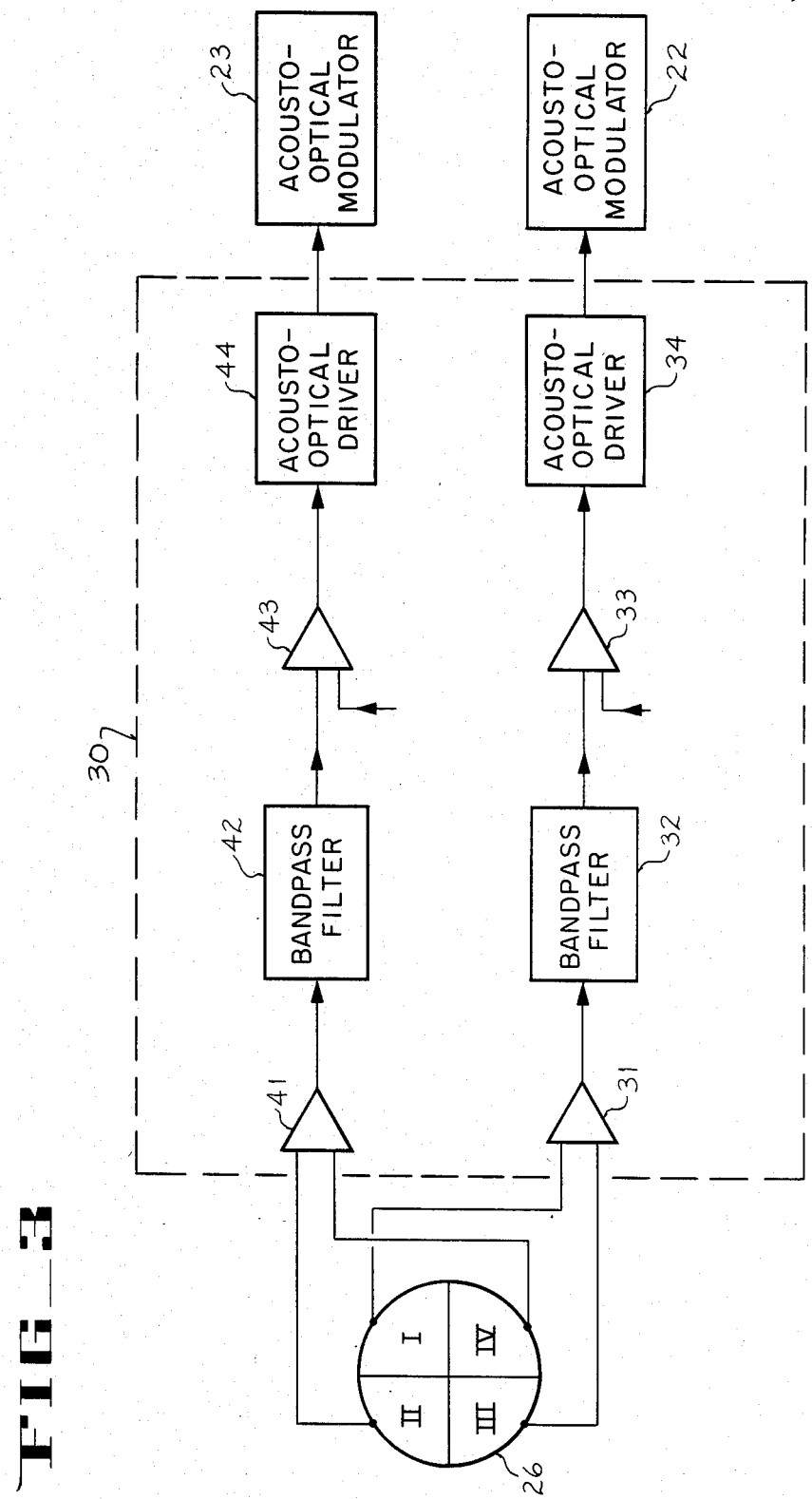
FIG_3

SELF-REFERENCING MACH-ZEHNDER INTERFEROMETER

The Government has rights in this invention pursuant to Contract F30602-83-C-0013 awarded by the Department of the Air Force.

TECHNICAL FIELD

This invention relates generally to self-referencing interferometry for optical beam wavefront monitoring applications, and more particularly to an apparatus in which a component of a beam whose wavefront is to be monitored is steered through a spatial light filter in the reference arm of a Mach-Zehnder interferometer in order to achieve real-time adjustment for dynamic variations in wavefront tilt.

BACKGROUND

A conventional Mach-Zehnder interferometer comprises beamsplitters and reflectors for dividing an optical beam into two components that travel along separate but precisely equal optical paths, and for recombining the two beam components to produce an interference pattern. One optical path passes through the "reference arm" of the interferometer, and the other optical path passes through the "object arm" of the interferometer. The interference pattern resulting from recombination of the two beam components provides information about the amplitude and phase distributions of the wavefront of the optical beam.

A Mach-Zehnder interferometer can be made to be "self-referencing" by providing a spatial light filter in the reference arm of the interferometer adjacent the position at which the beam component travelling through the reference arm recombines with the beam component travelling through the object arm. The beam component traveling through the reference arm is called the "reference component," and the beam component travelling through the object arm is called the "information component". The spatial light filter essentially comprises an opaque plate with a pin hole aperture, which functions to remove higher-order aberrations from the reference component of the beam.

In a self-referencing Mach-Zehnder interferometer, the wavefront of the reference component of the beam whose wavefront is being monitored retains only the zeroth-order aberrations that are acquired during passage of the reference component through the atmosphere (or other medium) along the reference arm. One of these zeroth-order aberrations retained by the reference component is the tilt of the wavefront, which is caused by refraction of the reference component by the atmosphere. Tilt of the reference component wavefront is not affected by the spatial light filter.

The wavefront of the information component of the beam is likewise distorted in passing through the atmosphere, but the higher-order aberrations as well as the zeroth-order aberrations are retained by the information component wavefront when the information component is recombined with the reference component. Asymmetries appearing in the interference pattern resulting from recombination of the information component and the reference component provide an indication of the extent of the aberrations imposed by the atmosphere upon the wavefront of the optical beam.

When the information component is recombined with the reference component, the information component is thereby compared (or "referenced") to the reference component. In effect, the aberrated optical beam (i.e., the beam after having passed through the aberration-causing atmosphere) is referenced with respect to a relatively unaberrated version of itself (i.e., unaberrated except for zeroth-order aberrations). The resulting interference pattern provides phase and amplitude information about the aberrated optical beam wavefront, and provides a quantitative indication of the aberrative effect of the atmosphere upon optical beam. However, this phase and amplitude information is distorted due to the zeroth-order aberrations that have not been eliminated from the reference component of the beam.

When a conventional self-referencing Mach-Zehnder interferometer is used to monitor the wavefront of an optical beam, aberrations due to wavefront tilt are generally present in the reference component of the beam in the reference arm of the interferometer. Techniques used in other applications for eliminating aberrations due to wavefront tilt generally involve electromechanical servomechanisms for varying the reflectance angles of mirrors defining optical paths. However, such techniques cannot be used in Mach-Zehnder interferometry. A variation in the reflectance angle of a mirror defining the optical path of a beam component travelling through the reference arm of a Mach-Zehnder interferometer would inherently change the path length of the reference arm, which would violate the requirement of the Mach-Zehnder interferometry that the optical path length of the reference arm remain constant.

Correction of the reference component for wavefront tilt in a self-referencing Mach-Zehnder interferometer was accomplished in the prior art by sequential phase-shifting operations (i.e., "phase-conjugate" techniques) involving complex signal processing that required sampling of the reference component at discrete time intervals. However, until the present invention, there has been no technique for correcting the reference component of a beam whose wavefront is being monitored by a self-referencing Mach-Zehnder interferometer in order to compensate in real time for aberrations due to wavefront tilt.

In applications of self-referencing Mach-Zehnder interferometry for monitoring the wavefronts of optical beams from relatively dim sources (e.g., distant stars, satellite beacons, or military targets), it is necessary to maintain precise alignment of the reference component of the beam with the pin-hole aperture of the spatial light filter in order that the amount of light entering the pin-hole aperture can remain continuously at a maximum. However, unless the alignment of the reference component of the beam with the pin-hole aperture of the spatial light filter can be continuously adjusted in real time, aberrations due to wavefront tilt would vary the amount of light passing through the pin-hole aperture. There has been a need for a technique for providing continuous real-time adjustment of the reference component of an optical beam in a self-referencing Mach-Zehnder interferometer in order to correct for dynamic variations in wavefront tilt.

SUMMARY OF THE INVENTION

A self-referencing Mach-Zehnder interferometer according to the present invention comprises acousto-optical instrumentation to compensate in real time for dynamic variations in wavefront tilt.

More particularly, a self-referencing Mach-Zehnder interferometer according to the present invention comprises an acousto-optical beam-steering device positioned in the reference arm of the interferometer to maintain constant alignment of the reference component of the beam with the pin-hole aperture of a spatial light filter. A quadrant photodetector senses variations in the position of the centroid of the reference component with respect to the pin-hole, and generates electronic signals corresponding to changes in the centroid position. These electronic signals activate acousto-optical modulators positioned in the reference arm, which cause deflections of the reference component of the beam as necessary to restore the centroid of the reference component to precise alignment with the pin-hole aperture of the spatial light filter.

DESCRIPTION OF THE DRAWING

FIG. 1 is a schematic representation of a self-referencing Mach-Zehnder interferometer according to the present invention.

FIG. 2 is an expanded schematic representation of the beam-steering instrumentation of the interferometer of FIG. 1.

FIG. 3 is a schematic representation of electronic circuitry for the beam-steering instrumentation of FIG. 2.

BEST MODE OF CARRYING OUT THE INVENTION

An optical interferometer of the Mach-Zehnder type according to the present invention is illustrated schematically in FIG. 1. A first beamsplitter 10 divides an optical beam whose wavefront is to be monitored into two components, viz., an information component and a reference component. In accordance with the preferred embodiment of the invention, the first beamsplitter 10 divides the beam into components that are substantially equal in intensity. The information component is transmitted through the first beamsplitter 10 to a first mirror 11, which reflects the information component to a second beamsplitter 12. The reference component is reflected by the first beamsplitter 10 to a second mirror 13, which reflects the reference component toward the second beamsplitter 12.

The optical path of the information component from the first beamsplitter 10 via the first mirror 11 to the second beamsplitter 12 is designated as the object arm of the interferometer, and the optical path of the reference component from the first beamsplitter 10 via the second mirror 13 to the second beamsplitter 12 is designated as the reference arm of the interferometer. It is a characteristic of a Mach-Zehnder interferometer that the object arm and the reference arm define a parallelogram, so that the optical path length of the object arm is precisely equal to the optical path length of the reference arm.

The second beamsplitter 12 causes the information component of the beam to be reflected and the reference component of the beam to be transmitted, so that both the information component and the reference component are recombined and directed to a spatial light modulator 14. The recombined information and reference components interfere with each other, and thereby produce an interference pattern that changes dynamically at the spatial light modulator 14 in response to dynamic variations in the atmosphere through which the beam passes.

A spatial light filter 15 is positioned in the reference arm of the interferometer between the second mirror 13 and the second beamsplitter 12, preferably adjacent the second beamsplitter 12. The spatial light filter 15 comprises an opaque plate with a pin-hole aperture, which is positioned to transmit the reference component reflected from the second mirror 13. The pin-hole aperture is dimensioned with respect to the diameter of the reference component so as to remove from the reference component substantially all second-order wavefront aberrations caused by atmospheric diffraction effects. As a consequence, the wavefront of the reference component transmitted by the second beamsplitter 12 is a substantially unaberrated version of the wavefront of the beam whose wavefront is to be monitored. However, wavefront tilt of the reference component cannot be removed by the spatial light filter 15.

In order to insure that the maximum-intensity centroid of the reference component is continuously aligned with the pin-hole aperture of the spatial light filter 15, it is necessary to provide means for steering the reference component in real time in response to dynamic variations in the index of refraction and/or in diffraction-effecting characteristics of the atmosphere. Any changes in wavefront tilt of the beam due to dynamic variations in atmospheric parameters would result in concomitant degradation of the alignment of the centroid of the reference component of the beam with the pin-hole aperture of the spatial light filter 15. It is a feature of the interferometer of the present invention that an acousto-optical beam-steering device 20 is positioned in the reference arm between the second mirror 13 and the spatial light filter 15 to maintain continuous alignment of the reference component centroid with the pin-hole aperture of the spatial light filter 15. Pulsing of a laser beam is a well-known expedient for providing peak-intensity for a laser signal. An interferometer according to the present invention is especially useful in applications requiring the monitoring of the wavefront of a pulsed laser beam.

The beam-steering device 20 of FIG. 1, which is illustrated in schematic detail in FIG. 2, comprises an optical focussing system represented by a lens 21, which transmits the reference component of the beam to a first acousto-optical modulator 22. The reference component is transmitted by the first acousto-optical modulator 22 to a second acousto-optical modulator 23 that transmits the reference component to a third beamsplitter 24 which is an amplitude splitting beamsplitter. Each of the acousto-optical modulators 22 and 23 is a Bragg cell that functions as a beam deflector. The modulator 22 causes deflections of the reference component in a horizontal plane perpendicular to the direction of propagation of the reference component, and the modulator 23 causes deflections of the reference component in a vertical plane perpendicular to the direction of propagation of the reference component.

The reference component of the beam, after passing through (and being deflected as appropriate by) the acousto-optical modulators 22 and 23, is divided by the third beamsplitter 24 into a major portion and a minor portion. In accordance with the preferred embodiment, the third beamsplitter 24 transmits approximately ⅞ths of the intensity of the reference component as the major portion thereof, and reflects approximately ⅛th of the intensity of the reference component as the minor portion thereof. The major portion of the reference component is transmitted via a collimating lens system (represented schematically by a lens 25) to the spatial light filter 15. The minor portion of the reference component is reflected to a photosensitive quadrant detector 26, which is sensitive to dynamic variations in the position of the centroid of the minor component due to dynamic variations in wavefront tilt of the reference component.

The quadrant detector 26 is a conventional device that generates electronic signals, which activate conventional electronic circuitry 30 to drive the acousto-optical modulators 22 and 23. As discussed below, the modulators 22 and 23 steer the reference component as appropriate to maintain precise positioning of the maximum-intensity centroid of the reference component upon the pin-hole aperture of the spatial light filter 15. A schematic representation of suitable electronic circuitry 30 for driving the acousto-optical modulators 22 and 23 is shown in FIG. 3.

With reference to FIG. 3, electrical leads from diagonally opposite quadrants I and III on the quadrant detector 26 provide inputs to an operational amplifier 31, which generates an output signal whose value is determined by the respective intensity responses of the quadrants I and III. The output signal from the operational amplifier 31 is fed to a bandpass filter 32, which provides a filtered input to an operational amplifier 33. The output of the operational amplifier 33 serves as input to a conventional acousto-optical driver 34.

Similarly, electical leads from the diagonally opposite quadrants II and IV on the quadrant detector 26 provide inputs to an operational amplifier 41, which generates an output signal whose value is determined by the intensity responses of the quadrants II and IV, respectively. The output signal from the operational amplifier 41 is fed to a bandpass filter 42, which provides a filtered input to an operational amplifier 43. The output of the operational amplifier 43 serves as input to a conventional acousto-optical driver 44.

The outputs from the acousto-optical drivers 34 and 44 provide electronic input signals to the acousto-optical modulators 22 and 23, respectively. These input signals generate acoustic waves in the optical medium through which the reference component of the beam travels in passing through the modulators 22 and 23. When an acoustic wave is generated in an optical medium, the refractive index of the optical medium undergoes a periodic spatial perturbation corresponding to the periodicity of the acoustic wave. The spatial perturbation of the refractive index causes the optical medium to function as a diffraction grating having an "acoustic grating spacing" equal to the wavelength $\Lambda$ of the acoustic wave. When monochromatic light passes through an acousto-optically active medium, the light is diffracted by an amount $$\theta_b = \lambda/2n\Lambda$$

$\theta_b$ is the Bragg angle of the medium, $\lambda$ is the optical wavelength in freespace of the light passing through the medium, and n is the unperturbed refractive index of the optical medium.

The direction of an optical beam component passing through a Bragg cell can be changed simply by changing the acoustic frequency of the wave being propagated through the optical medium of the Bragg cell. By arranging two Bragg cells in "crossed configuration" (i.e., so that the "acoustic gratings" are at right-angle to each other), the plane perpendicular to the direction of propagation of the reference component of the beam that is to be monitored can be randomly accessed. In this way, tilt aberrations of the beam wavefront can be dynamically eliminated.

A description has been presented herein of a particular embodiment of a self-referencing Mach-Zehnder interferometer according to the present invention, which enables adjustment of the alignment of the reference component of an optical beam to be be achieved in real time to compensate for dyanmic variations in wavefront tilt. However, practitioners skilled in optical interferometry, upon perusing the foregoing specification and the accompanying drawing, would be able to devise other embodiments of the invention that would be specially suitable for particular applications. The foregoing specification and the accompanying drawing are illustrative of the invention, which is more generally defined by the following claims and their equivalents.

We claim:

1. A self-referencing interferometer of the Mach-Zehnder type for monitoring an optical beam wavefront in real time, said interferometer comprising:
   (a) beamsplitting elements and reflective elements for dividing said optical beam into an information component and a reference component, and for recombining said information component and said reference component to form an interference pattern indicative of aberrations of said optical beam wavefront;
   (b) a spatial light filter positioned to remove second-order aberrations from said reference component of said beam prior to recombination of said information component and said reference component, said spatial light filter having a pin-hole apertured portion for transmitting said reference component while removing said second-order aberrations; and
   (c) acousto-optical beam-steering means for steering said reference component of said beam in real time to maintain substantially continuous alignment of a maximum-intensity centroid of said reference component with respect to said pin-hole apertured portion of said spatial light filter, said acousto-optical beam-steering means comprising:
      (i) a pair of Bragg cells oriented in crossed configuration with respect to each other, said Bragg cells being positioned so that said reference component of said beam passes through said Bragg cells in succession prior to being transmitted by said pin-hole apertured portion of said spatial light filter;
      (ii) quadrant detector means;
      (iii) beamsplitting means for passing a portion of said reference component of said beam from said pair of Bragg cells to said quadrant detector; and
      (iv) electronic circuitry responsive to intensity-indicative signals from said quadrant detector for adjusting acoustic grating characteristics of said Bragg cell in real time, said reference component of said beam thereby being deflectable as appropriate to maintain substantially continuous alignment of said maximum-intensity centroid of said reference component with respect to said pin-hole apertured portion of said spatial light filter.

* * * * *